United States Patent
Duksa

[11] Patent Number: 5,425,271
[45] Date of Patent: Jun. 20, 1995

[54] FLUID CONDITION INDICATOR DEVICE

[76] Inventor: Thomas Duksa, 343 East St., Wolcott, Conn. 06716

[21] Appl. No.: 145,785

[22] Filed: Oct. 28, 1993

[51] Int. Cl.6 ............................................. G01F 23/38
[52] U.S. Cl. ..................................... 73/317; 116/229
[58] Field of Search .................. 116/204, 229; 73/314, 73/317, DIG. 5

[56] References Cited

U.S. PATENT DOCUMENTS

| | | | |
|---|---|---|---|
| Re. 19,285 | 8/1934 | White et al. | 73/317 |
| 530,592 | 12/1894 | Kleritj . | |
| 903,212 | 11/1908 | Martin | 73/317 |
| 1,040,127 | 10/1912 | Bonesteel . | |
| 1,081,843 | 12/1913 | Larson | 73/313 |
| 1,253,324 | 1/1918 | Windridge | 73/313 |
| 1,617,287 | 2/1927 | Huggins . | |
| 1,723,172 | 8/1929 | Huggins . | |
| 2,233,572 | 3/1941 | Atkins . | |
| 2,920,484 | 1/1960 | Reichert | 73/319 |
| 3,024,659 | 3/1962 | White . | |
| 3,420,103 | 1/1969 | Peschek | 73/319 |
| 3,505,869 | 4/1970 | Crawford | 73/313 |
| 3,964,312 | 6/1976 | Sebek | 73/314 |
| 4,194,397 | 3/1980 | Yasuda | 73/314 |
| 4,512,190 | 4/1985 | Sledmere | 73/319 |

FOREIGN PATENT DOCUMENTS 940219 10/1963 United Kingdom ........... 73/DIG. 5

Primary Examiner—William A. Cuchlinski, Jr.
Assistant Examiner—Willie Morris Worth
Attorney, Agent, or Firm—Chilton, Alix & Van Kirk

[57] ABSTRACT

A liquid level indicator has a housing which defines a pair of fluidly isolated chambers. A flag including a first magnet is pivotally mounted in a forwardly disposed of the chambers and a lens is mounted in the front of the forwardly disposed chamber. An arm is pivotally mounted in and extends out of the rearly disposed of the chambers, a second magnet is attached to the end of the arm which is disposed in the rearwardly disposed arm, and a float is attached to the other end of the arm. The first and second magnets are permanently magnetically coupled so that movement of the float will cause arcuate movement of the second magnet which is translated to rotational movement of the flag and its integral first magnet.

11 Claims, 1 Drawing Sheet 5,425,271

FLUID CONDITION INDICATOR DEVICE

BACKGROUND OF THE INVENTION

The present invention relates to a new and improved fluid responsive indicator and particularly to a liquid level warning device which may easily be installed on existing equipment such as machine tools having a lubricating oil reservoir.

Direct reading liquid level indicators such as sight gauges are limited in their application. Highly viscous liquids will coat the window of a conventional sight gauge making the level difficult or impossible to read. High pressure liquids may cause the window to blow out, crack or leak. Temperature and pressure changes cause aging of the window sealant resulting in leakage.

Bypass type liquid level indicators, while isolated from the liquid being monitored, require two fluid connections to the container for the liquid. Bypass indicator response time increases with the viscosity of the liquid. Also, for liquids subject to re-crystallization upon cooling, the bypass unit and lines must be heated to the same temperature as the process container. Bypass indicator connections require numerous fittings, all of which are subject to leakage. Floats utilized in bypass indicators, the floats carrying a magnet, are subject to friction along the stand pipe walls. Such friction effects operation and results in wear to the stand pipe. The spacing between the bypass indicator and the float magnet to which it is responsive results in the need to employ supplemental magnets to completely rotate the flag magnets of the indicator. Since the flag magnets occupy discrete intervals in the indicating column, the indicated level only approximates the actual level. The actual level can be anywhere between successive flag magnet trip points. Samples of prior art bypass-type liquid level indicators may be seen from U.S. Pat. Nos. 530,592, 1,040,127, 2,233,572 and 4,512,190.

Additional examples of indicators which employ the field provided by a moving magnet to actuate visually observable signalling devices may be seen from U.S. Pat. Nos. 1,081,843, 1,253,324, 1,617,287, 1,723,172, 2,920,484, 3,024,659, 3,420,103, 3,505,869, 3,964,312, and 4,194,397.

SUMMARY OF THE INVENTION

While not limited thereto in its utility, the present invention is particularly well suited for use as a liquid level indicator and, in such an environment, the invention overcomes the above-discussed and other deficiencies and disadvantages of the prior art by providing a reliable, uncomplicated, inexpensive and very compact indicator. An indicator in accordance with the invention is not effected by properties of the liquid being monitored such as temperature, pressure, viscosity and temperature of crystallization. An indicator in accordance with the present invention also has the attribute of being capable of installation on existing equipment. The present invention may be retrofit as a replacement for direct reading indicators such as sight windows. Alternatively, the present invention may serve as a replacement for a bypass-type indicator by, for example, being used in pairs. Installation is simplified since only a single fluid connection to the container for the liquid to be monitored is required. Additionally, the present invention may be used in spaces too confined to allow use of a bypass type level indicator.

Apparatus in accordance with the invention employs a first magnet which, in response to a change in the level of the liquid being monitored, swings through an arc. This pivotally supported first magnet is magnetically permanently coupled to a pivotal "flag". The pivotal first magnet is mechanically coupled to a fluid responsive actuator such as a float. The "flag" and first magnet are supported in a housing which defines a pair of fluidly isolated chambers. The rear outside portion of the housing is adapted for installation in a wall of a liquid container such as an oil reservoir. The "flag" includes a second pivotally mounted magnet which is housed in a forwardly disposed one of the housing chambers. The "flag" also comprises first and second members which are supported for movement with the second magnet. These members are differently colored and cooperate to form a readily understandable and easily seen indicator. A lens is mounted on the front of the one chamber to facilitate viewing the "flag". A pivotally mounted arm extends out of the rearwardly disposed of the housing chambers. The first magnet is mounted on the end of the arm disposed within the rear chamber such that the first and second magnets are permanently magnetically coupled. The fluid responsive member, i.e., the float in a liquid level responsive device in accordance with the invention, is attached to the other end of the arm and thus is in contact with the liquid. Accordingly, in a liquid level responsive device, the first magnet will swing through an arc, thereby causing rotation of the second magnet and the "flag", as the level of the liquid being monitored changes.

BRIEF DESCRIPTION OF THE DRAWINGS

The present invention may be better understood and its numerous objects and advantages will become apparent to those skilled in the art by reference to the accompanying drawings wherein like reference numerals refer to like elements in the two figures and in which.

DESCRIPTION OF THE DISCLOSED EMBODIMENT

Figure 1:
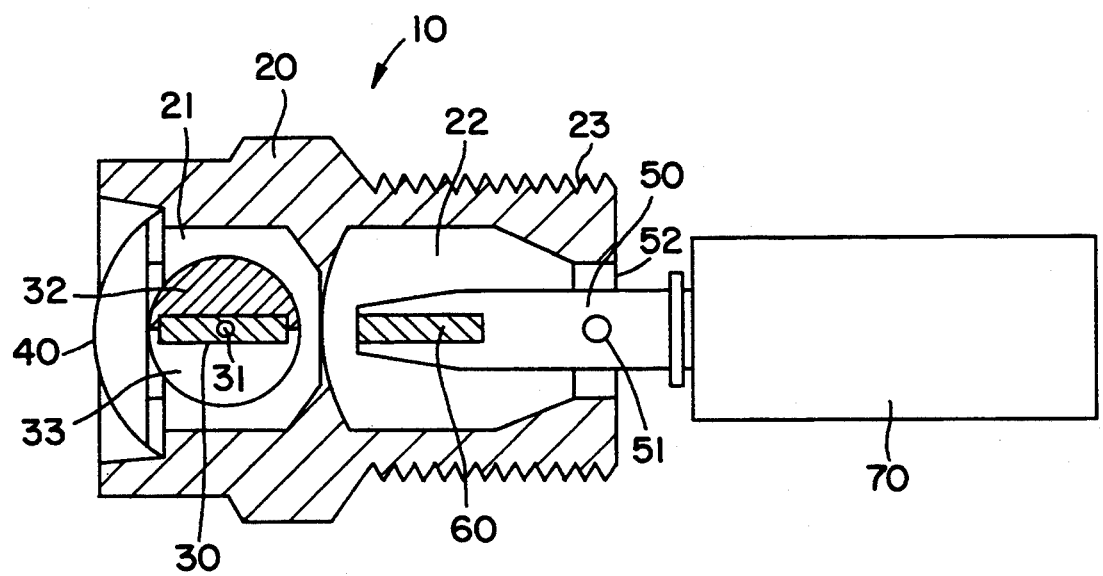
FIG. 1 is a sectional view illustrating a liquid level indicator apparatus in accordance with the present invention.
Figure 2:
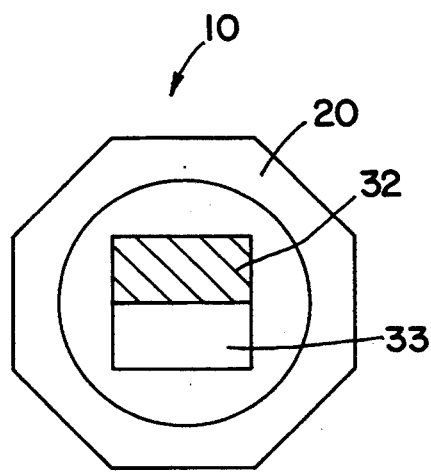
FIG. 2 is a front view of the apparatus of FIG. 1.

With reference to the drawings, a liquid level indicator in accordance with the present invention is generally indicated at 10 in FIG. 1. Indicator 10 has a housing 20, comprised of a non-magnetic material, which defines a pair of axially aligned, fluidly isolated chambers 21 and 22. The rear of housing 20 is shown as being provided with external threads 23 for installation in the wall of a container for the liquid to be monitored. Other installation techniques are, of course, possible.

A magnet 30 is pivotally mounted in the front chamber 21 by axle 31. Magnet 30 is encapsulated in a "flag" which comprises first and second longitudinal halves as represented at 32 and 33. Each of the plastic flag members 32 and 33 is a different color. A lens 40 is mounted in an opening at the front of the front chamber 21.

An arm 50 is pivotally mounted intermediate its length in the rear chamber 22 by axle 51. A first end of arm 50 extends out of rear chamber 22 through an opening 52. Another magnet 60 is mounted on the second end of arm 50 and is magnetically coupled to magnet 30. A fluid responsive actuator in the form of a float 70 is attached to the first end of the arm 50.

A change in the level of the liquid being monitored will cause vertical motion of the float 70. By pivoting about axle 51, the arm 50 will transmit the motion of float 70 to magnet 60, causing the second magnet 60 to move in the opposite direction with respect to the float.

As noted above, the magnet 60 is permanently magnetically coupled to the first magnet 30. Downward motion of magnet 60 will thus cause the magnet 30 and therefore also the "flag" members 32 and 33, to rotate about the axle 31 in a clockwise direction. Conversely, upward motion of magnet 60 will cause magnet 30 to rotate in a counter-clockwise direction. Rotation of magnet 30 will expose different amounts of the differently colored members 32 and 33 to view through the lens 40.

While a preferred embodiment has been shown and described, various modifications and substitutions may be made thereto without departing from the spirit and scope of the invention. For example, while the "flag" 30 has been shown as cylindrically shaped, it could be in the form of a sphere. Accordingly, it is to be understood that the present invention has been described by way of illustration and not limitation.

I claim:

1. A fluidic indicator comprising:

housing means, said housing means defining a pair of adjacently located, fluidiely isolated chambers, said chambers each having an access opening;

flag means rotatably mounted within a first of said chambers, said flag means including a first magnet and having surface portions of different color;

lens means mounted on said housing means so as to cover the access opening to said first chamber;

arm means, said arm means including a pivotally mounted elongated arm, a first end of said arm terminating within said second chamber, said arm extending out of said second chamber through the associated access opening;

fluid responsive actuator means attached to said arm second end whereby movement of said fluid responsive means will cause said arm first end to swing through an arc; and a second magnet affixed to said arm first end for movement therewith, said second magnet being permanently magnetically coupled to said first magnet whereby arcuate movement of said second magnet with said arm first end will cause rotational movement of said flag means.

2. The apparatus of claim 1 wherein said fluid responsive actuator means comprises a float.

3. The apparatus of claim 2 wherein said flag means is in the form of a cylinder pivotally mounted through its axis.

4. The apparatus of claim 2 wherein said flag means is in the form of a sphere.

5. The apparatus of claim 1 wherein said housing means further comprises an outside surface, said outside surface having a first portion surrounding said second chamber, said outside surface first portion being threaded.

6. The apparatus of claim 2 wherein said housing means further comprises an outside surface, said outside surface having a first portion surrounding said second chamber, said outside surface first portion being threaded.

7. The apparatus of claim 2 wherein said housing means chambers are axially aligned.

8. The apparatus of claim 6 wherein said housing means chambers are axially aligned.

9. The apparatus of claim 8 wherein said housing means is comprised of non-magnetic material.

10. The apparatus of claim 8 wherein the axis of rotation of said flag means is oriented parallelly with respect to the pivot axis for said arm.

11. The apparatus of claim 1 wherein said flag means further comprises a pair of differently colored plastic members, said members being joined together to substantially encapsulate said first magnet, the interface between said members defining a plane, the axis about which said flag means rotates lying in said plane.

* * * * *